United States Patent
Attwater et al.

(10) Patent No.: US 7,225,132 B2
(45) Date of Patent: May 29, 2007

(54) METHOD FOR ASSIGNING AN IDENTIFICATION CODE

(75) Inventors: David J Attwater, Ipswich (GB); John S Fisher, Ipswich (GB); Paul F R Marsh, Ipswich (GB)

(73) Assignee: British Telecommunications plc, London (GB)

( * ) Notice: Subject to any disclaimer, the term of this patent is extended or adjusted under 35 U.S.C. 154(b) by 817 days.

(21) Appl. No.: 10/203,788

(22) PCT Filed: Mar. 13, 2001

(86) PCT No.: PCT/GB01/01095

§ 371 (c)(1),
(2), (4) Date: Aug. 14, 2002

(87) PCT Pub. No.: WO01/69544

PCT Pub. Date: Sep. 20, 2001

(65) Prior Publication Data

US 2003/0009321 A1 Jan. 9, 2003

(30) Foreign Application Priority Data

Mar. 14, 2000 (GB) ............... 00302038.5
Mar. 14, 2000 (GB) ............... 00302044.3

(51) Int. Cl.
*G10L 11/00* (2006.01)
*G10L 21/00* (2006.01)
*G10L 15/00* (2006.01)
*G10L 15/28* (2006.01)
*G10L 17/00* (2006.01)

(52) U.S. Cl. ............... 704/273; 704/243; 704/250; 704/257; 704/1; 704/9; 704/10; 726/28; 713/184

(58) Field of Classification Search ............... 704/1, 704/4, 243, 250, 257, 273, 10, 9; 726/28; 713/184
See application file for complete search history.

(56) References Cited

U.S. PATENT DOCUMENTS 4,277,644 A   7/1981   Levinson et al.

(Continued)

FOREIGN PATENT DOCUMENTS

| WO | WO 91/09383 | 7/1991 |
| WO | WO 95/18441 | 7/1995 |
| WO | WO 99/42992 | 8/1999 |

OTHER PUBLICATIONS

Office Action in U.S. Appl. No. 10/203,823, filed Dec. 19, 2005.

(Continued)

*Primary Examiner*—Richemond Dorvil
*Assistant Examiner*—Thomas E. Shortledge
(74) *Attorney, Agent, or Firm*—Nixon & Vanderhye P.C.

(57) ABSTRACT

An identification code is assigned to a user by making a selection from a closed set of possible tokens. The selection is determined algorithmically by user identity data. The format of the identification code may comprise a sequence of natural language words chosen from closed sets and a separator character having a fixed value or a small range of possible values. The closed sets may be programmed in the recognition grammar of a speech interface to secure services such as banking.

9 Claims, 11 Drawing Sheets

U.S. PATENT DOCUMENTS

| | | | |
|---|---|---|---|
| 5,222,187 A * | 6/1993 | Doddington et al. ....... | 704/200 |
| 5,430,827 A * | 7/1995 | Rissanen .................... | 704/272 |
| 5,548,647 A | 8/1996 | Naik et al. | |
| 5,821,871 A * | 10/1998 | Benzler ...................... | 340/5.8 |
| 5,832,063 A | 11/1998 | Vysotsky et al. | |
| 5,987,508 A | 11/1999 | Agraharam et al. | |
| 6,236,967 B1 * | 5/2001 | Brotman et al. ............ | 704/270 |
| 6,253,328 B1 * | 6/2001 | Smith, Jr. .................... | 726/18 |
| 6,337,899 B1 | 1/2002 | Alcendor et al. | |
| 6,449,620 B1 * | 9/2002 | Draper et al. ............... | 707/102 |
| 6,564,247 B1 * | 5/2003 | Todorov ..................... | 709/206 |
| 6,687,836 B1 | 2/2004 | Butler | |
| 2001/0032076 A1 | 10/2001 | Kursh | |

OTHER PUBLICATIONS

Smith, "Authenticating Users by Word Association", Computers & Ssecurity. International Journal of Devoted to the Study of Technical and Financial Aspects of Computer Security, NL, Elsevier Science Publishers, Amsterdam, vol. 6, No. 6, Dec. 1, 1987, pp. 464-470, XP000050578.

* cited by examiner

Address lookup queries

First name (eg John)         David

Surname (eg Smith)           Wells

Post area code (eg IP5)      IP2

Results

First Name      *David*

Surname         *Wells*

PostCode        IP2

VBank address: David.Whiskey13@Chantry

Figure 5

METHOD FOR ASSIGNING AN IDENTIFICATION CODE

This application is the U.S. national phase of international application PCT/GB01/01095 filed 13 Mar. 2001 which designated the U.S.

BACKGROUND

1. Technical Field

The present invention relates to secure services suitable for the use, for example, over a communications network. In particular, it concerns identification codes for users of such services.

2. Description of Related Art

Related inventions are described and claimed in our copending application EP00302045.0.

Increasingly, face-to-face transactions between customers and service providers are being a replaced by transactions carried out remotely over a communications network. This provides ease of access for the customer, and reduced costs for the service operator. For example, in the case of banking services, there has been to a rapid rise in Internet banking and in a telephone banking operations. Internet banking in particular, offers the possibility of large cost savings, since customer transactions can be fully automated. Currently, telephone banking is implemented using human operators and a call centre. It would be desirable to automate telephone banking using interactive voice response (IVR) technology. One potential barrier to doing so, is the need for secure identification of customers. Conventionally, for Internet banking using a text interface, the customer identifies themselves using an account number and PIN. However, using speech recognition systems, recognition accuracy for long strings of numbers is relatively poor. Accordingly, an alternative form of identification is required.

BRIEF SUMMARY OF EXEMPLARY EMBODIMENTS OF THE INVENTION

According to the present invention, there is provided a method of assigning an identification code from a finite grammar defining all possible identification codes, the method comprising the steps:

a) selecting a word from each of a plurality of predetermined sets of words according to identification data relating to a user;

b) concatenating said words to form a sequence for use as the identification code; and c) storing a record of the sequence and of the identity of the user associated with said identification code.

The present inventors have devised an identification code format that both optimises accuracy of recognition and also offers enhanced memorability and ease of use for the customer. This is achieved by using natural language words chosen from predefined and limited sets, in a predetermined order, for example first word, separator, second word. The word sets may then be programmed into the recognition vocabulary of a speech recognition system, and the format programmed into the recognition grammar, to enable the highest levels of recognition accuracy. The method of the invention maps a potentially unbounded set of users to addresses formed from closed sets of tokens in a way which is systematically determined by the users identifying data, and which is as a result memorable for the user.

Preferably the selecting step a) comprises sub steps of d) receiving from a user, identification data comprising a number of attributes, each attribute corresponding to one of said predetermined sets;

e) selecting for each user attribute, a word from the associated predetermined set which is related to the supplied user attribute.

For example, the selecting sub step e) may comprise selecting a word which is equal to the supplied user attribute if the supplied user attribute is a member of the associated predetermined set, otherwise selecting a word from the associated predetermined set which is related to the spelling of the supplied user attribute.

Preferably the finite grammar includes a phrase associated with one of said predetermined sets of words and in which the phrase distinguishes between homonyms in said one set of predetermined words. The phrase may be in the form of a number. The use of a short number of a few digits in conjunction with one of the natural language words allows several users to have a the same word from the set of words and adds to the phonetic distinctiveness of the whole phrase.

This preferred feature of the invention gives a further significant advantages by allowing the voice recognition interface to handle words which have shared pronunciation but different spelling (homophones) or common spellings but different pronunciation (homographs). This novel feature is not limited to use with the identification code format of the first aspect, but may also advantageously be used for disambiguation of members of a pre-defined vocabulary set in other contexts.

Preferably at least one of the predetermined sets of words comprises a set of personal names. In this case, preferably the number is associated with the element selected from the set of personal names.

It is found that the ease with which the identification code can be selected, and the memorability of the identification code are enhanced if part of the code is the name or the nickname of the user.

BRIEF DESCRIPTION OF THE DRAWINGS

Systems embodying the present invention will now be described in a further detail, by way of example only, with reference to the accompanying drawings, in which:

FIG. 5 shows an address being allocated to a user;

DETAILED DESCRIPTION OF EXEMPLARY EMBODIMENTS

Figure 1:
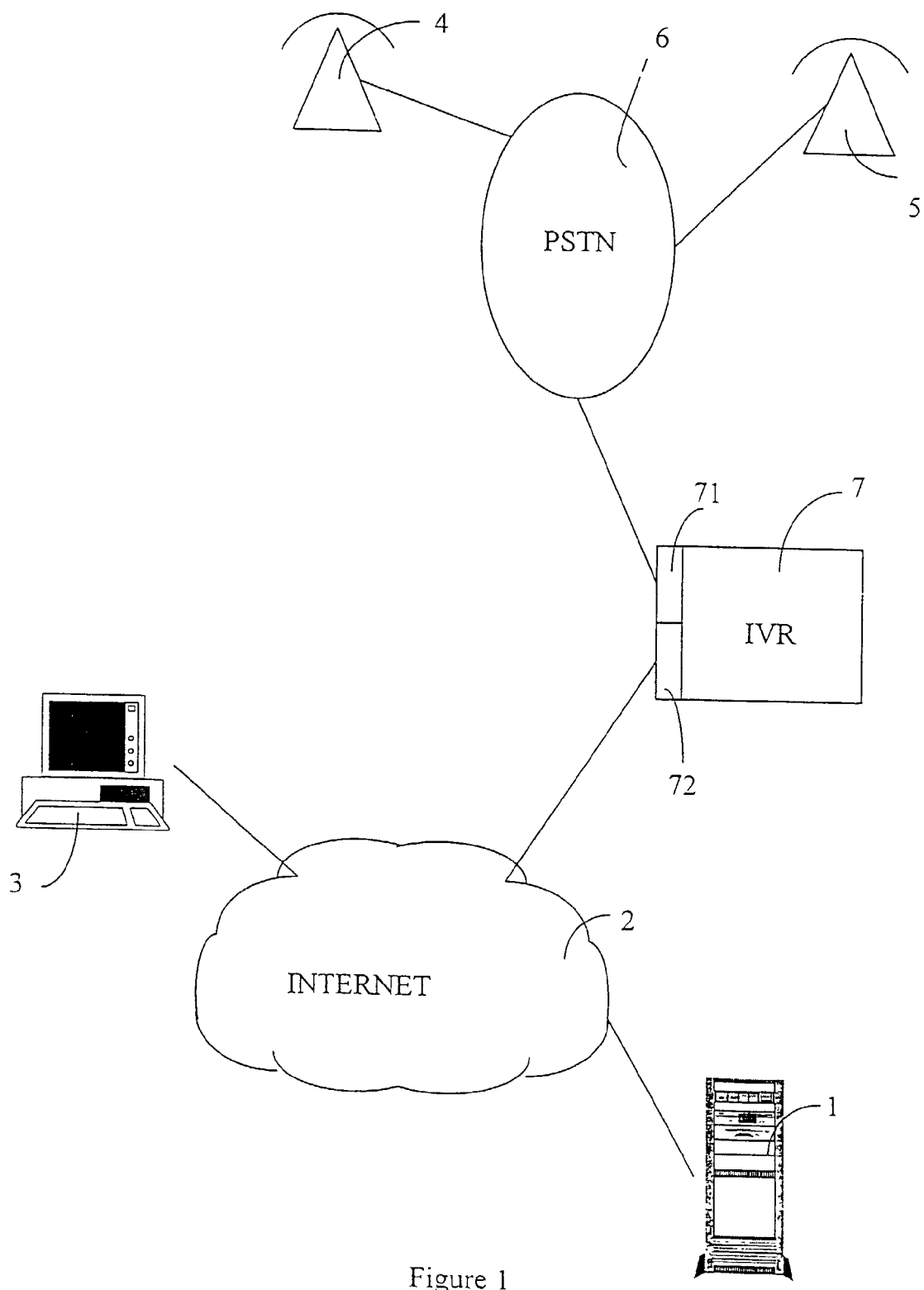
FIG. 1 is a diagram showing schematically a communications system suitable for use so with the present invention.

An applications server 1 is connected to the public Internet 2. In this example, the applications server runs a banking application. Both voice and text interfaces are provided to the banking application. A customer using the text interface, connects with the application server from a customer terminal 3, which, in this example, is a personal computer having an Internet connection. At other times, the customer uses a voice interface. In this case, the customer terminal is a telephone 4, 5 connected to a telephony network 6. Customers accessing the device interface are connected via the telephony networks 6 to an IVR platform 7. The platform 7 includes both a number of telephony ports 71 and also a TCP/IP (Transport control Protocol/Internet Protocol) data interface 72. The data interface 72 is connected to the application server 1. This connection may be via the public Internet 2, as shown in the figure. A secure sockets layer (SSL) connection is used to provide cryptographic security for the data. Alternatively, to provide enhanced security, a private intranet may be used, or a direct one-to-one link in the case of an IVR platform co-located with the application server.

Suitable IVR platforms are available commercially from Periphonics™. Speech recognition software for use on such a platform is available commercially from Nuance™. It will be understood that these products are identified by way of example only, and a number of alternative systems may be substituted including, for example, systems running on Windows NT™ workstations.

Figure 10:
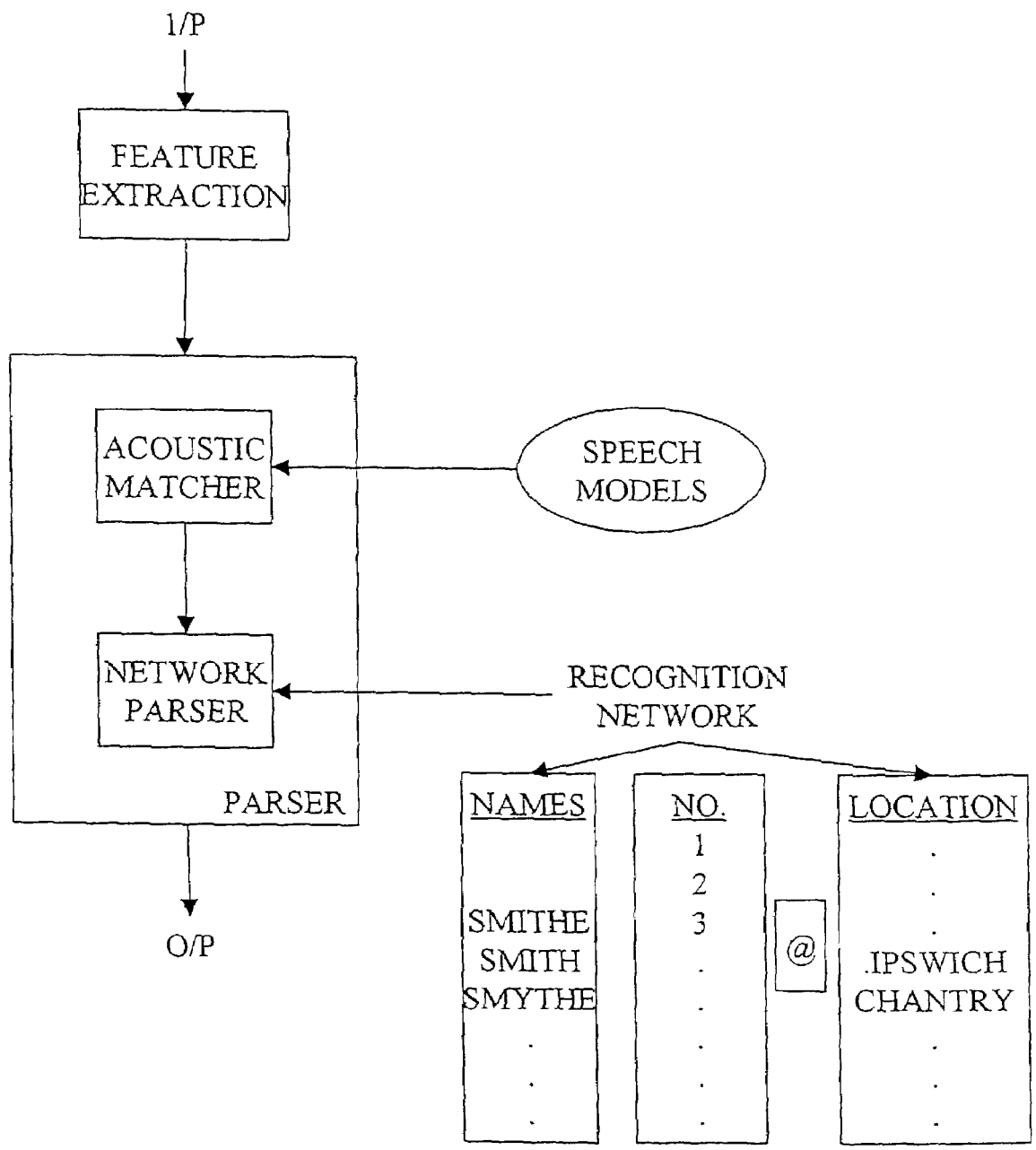
FIG. 10 shows a speech recognition system for use with in methods embodying the invention.

FIG. 10 shows schematically the architecture of the voice recognition system running on the IVR platform 7. The input is a digitised audio signal representing the user's speech. This is processed first by a feature extraction front end 101 before passing to a parser comprising an acoustic matcher 102 and a network parser 103. The acoustic matcher uses speech models 104 to identify elements of the speech signal. The network parser then uses a recognition network 105 embodying a preprogrammed recognition grammar to identify the words spoken by the user. In systems embodying the invention, the recognition grammar includes defined sets of natural language words, numbers and a separator character, as further described below.

Figure 2:
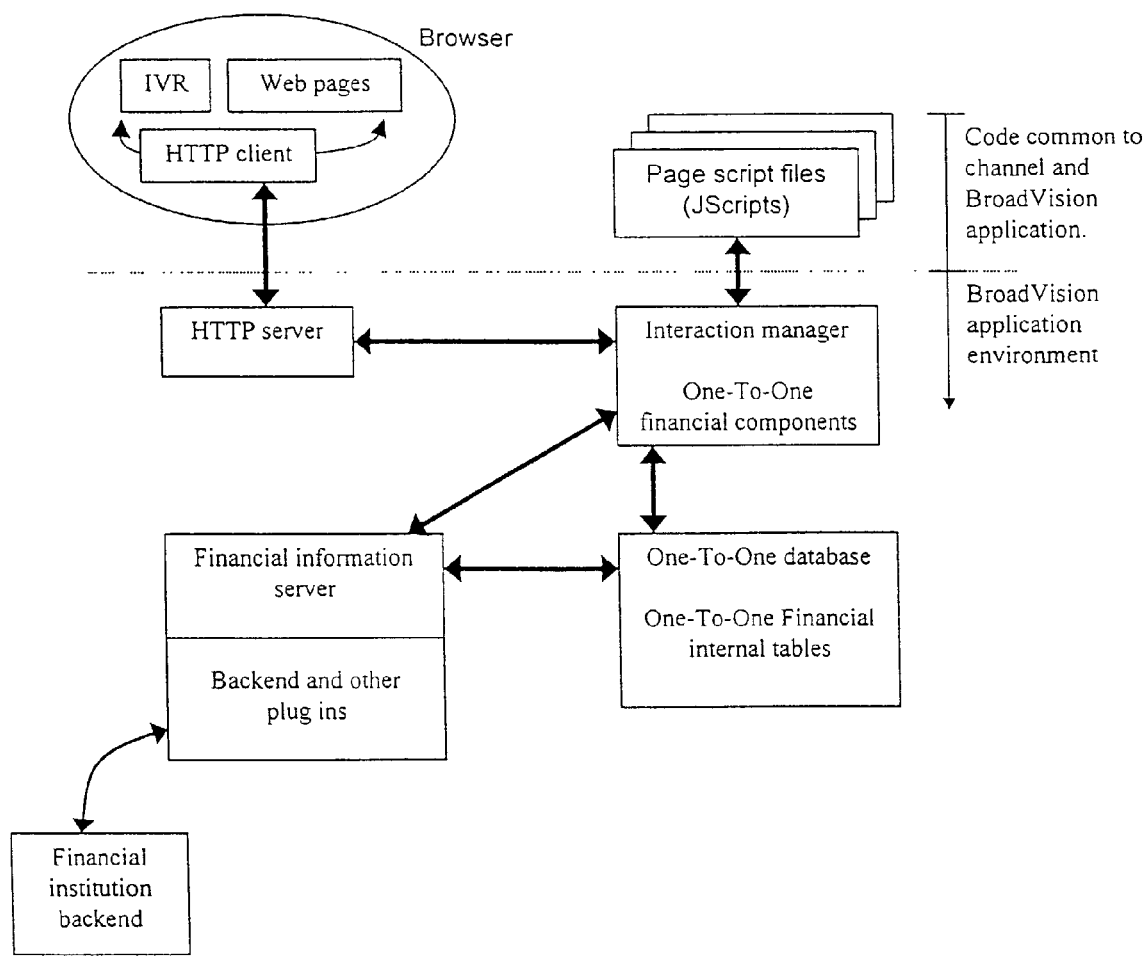
FIG. 2 is an overview of an application architecture.

In the present example, the applications running on the server 1 are implemented using a system known as BroadVision that is designed to give users access to account data via multiple channels including the world wide web. At the application level, a common interface is used for the different channels. FIG. 2 shows an overview of a BroadVision banking application. Both the IVR platform and the customer terminal 3 interact with the application via respective HTTP clients. These are termed generically "browsers", although the IVR platform client is not a conventional graphical/textual web browser. The IVR client does not require HTML information, but only minimal textual information. The communications between the HTTP server and the IVR client are a subset of the data passed between a conventional web browser and the server.

References in this document to textual interfaces encompass graphical interfaces such as that provided by a conventional web browser, and are not limited to purely textual interfaces.

Figure 3:
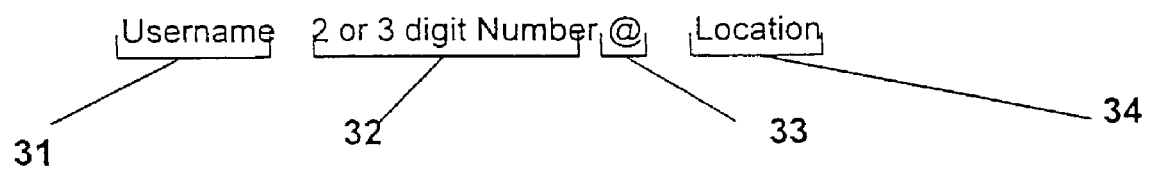
FIG. 3 is a diagram showing an example of an address format.

One important function of the BroadVision application is the verification of the identity of a customer prior to giving the customer access to account data. To facilitate this function, each user is assigned an identification code in a format termed the Vbank (virtual bank) address format. An example of this format is shown in FIG. 3. The first element 31 is a name selected from a list of e.g. 1000 possible personal names. A two or three digit number 32 is associated with the first element. The use of the number allows multiple users to have the same name as the first element and adds to the phonetic distinctiveness of the whole address. The next element is a separator element 33. In this case, this is the @ sign, pronounced "at". This is familiar to users from its use in email addresses, and has the advantages that its pronunciation is well known, although if need be, instructions on pronunciation may be communicated to the user, for example on the web page where the Vbank address is first issued. The final element relates to the location of the user and is a geographical name, e.g. a town name, chosen from a list of 500 such names. The geographical names are selected for their phonetic dissimilarity and popularity. For example, London is not included as it would be selected by too many users. Instead a number of London boroughs, e.g. Hammersmith, Croydon are included. This geographical element servers in use to aid phonetic separation of the user names. Other fields may be substituted where appropriate. For example, a set of postcodes, either complete postcodes or the first part of postcodes, e.g. IP3 and NG14, might be used.

Figure 4:
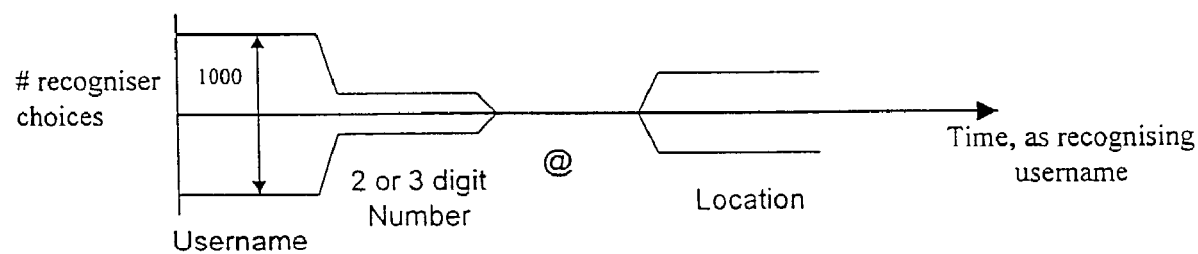
FIG. 4 shows the recognition search space for the format of FIG. 3.

In this example, the format allows for 1000×999×500, i.e. 499500000 combinations. FIG. 4 shows the recognition search space in the case of the Vbank format described above when, in use, a customer speaks their assigned address to the IVR interface. This is the search space considered by a voice recogniser on the IVR when choosing the most likely result for the utterance being processed. The narrower the search space, the higher the recognition accuracy. The more unconstrained a phrase, the wider the search space is.

The Vbank format, using defined sets of phonetically distinct names, offers optimal recognition accuracy via the IVR interface, while also being suitable for use via other channels as a text string. The set of names in the defined, closed sets may be chosen to minimize the confusability of the names using a method such as that disclosed in "Predictive Assessment for Speaker Independent Isolated Word Recognisers" Alison Simons, ESCA EUROSPEECH 95 Madrid 1995 pp 1465–1467. Some homophones or near homophones identified using a method such as that described in the Simons paper may nonetheless be included, and then a number is used for disambiguation as further described below.

FIG. 5 illustrates a preferred approach to assigning an address to an individual customer. A Web interface is used, for example, via the customer terminal. The customer is invited to enter their name and the postcode of their location. In this example, the user name has two parts, a first name, and a surname. These are typed by the user in the relevant query boxes on the Web page. Alternatively, one or more of the elements of the address may be selected by the user from a pull-down list of names displayed on the web page. A script running on the HTTP server then compares the names with the predefined set of 1000 user names. In this particular example, two sets are used, one set contains common first names and the other contains common surnames. In the example illustrated, the name typed by the user is David Wells. In this case, the first name, David, is included in the set of user names and accordingly is used in constructing the VBank address. The second name, Wells, is not present in the set of surnames. In the case of a name falling out side of the predefined set us of user surnames, the address allocation programme uses instead of the name, the corresponding initial as represented in the NATO phonetic alphabet. In this example, the initial is W and the corresponding part of the address uses "whisky". A two digit number, 13 is added to the names for distinctiveness. The address allocation programme takes the postcode, in this example IP2 and looks up a corresponding place name, "Chantry". This is concatenated with the names and the separator character "@" to give the complete user address: David.Whisky13@Chantry.

To enhance the distinctiveness of user names for users having, e.g., a surname not included in the predefined set, the initial and two following letters of the surname may be represented using the NATO phonetic alphabet. In the example above, the address would then be David. Whisky Echo Lima@Chantry.

Figure 11:
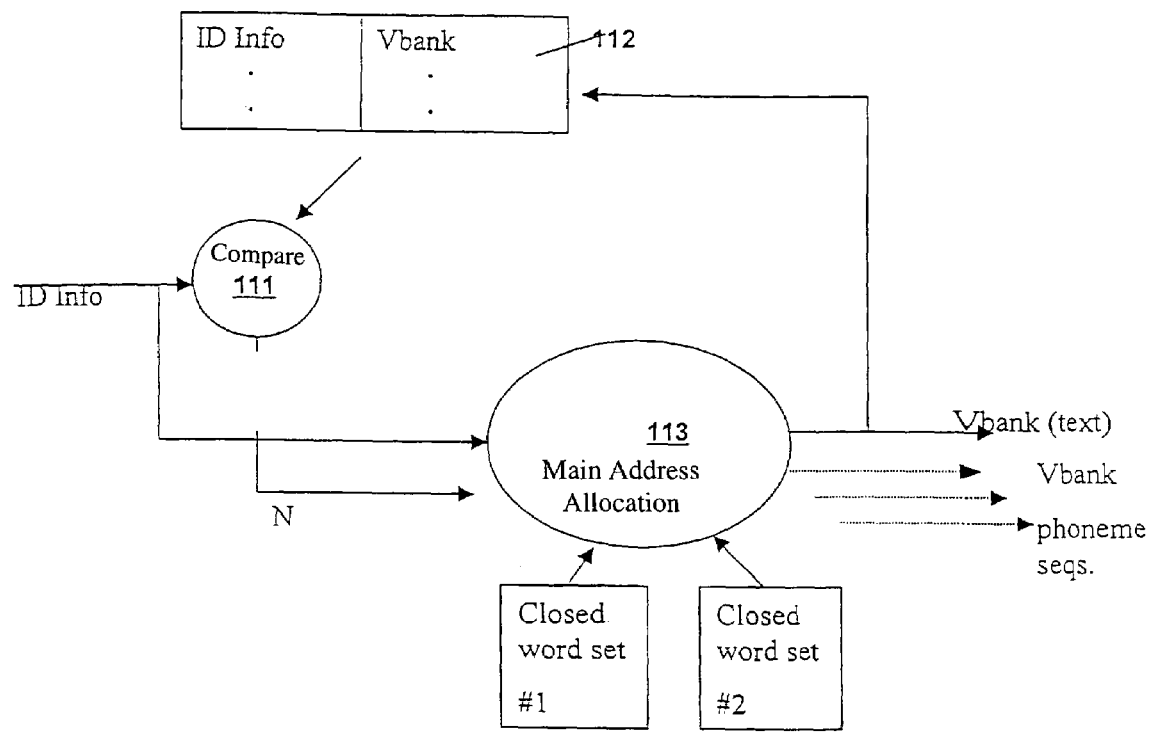
FIG. 11 shows an address-assigning algorithm.

FIG. 11 shows schematically an address allocation algorithm. The algorithm takes as its input identity information ("ID info") supplied by the user, for example the user's name and geographical location. A first module 111 of the algorithm compares the ID info with that received from previously enrolled users and stored, with allocated Vbank addresses, in table 112. The output of the module is a parameter N that corresponds to the number of users having matching ID info. For example, if the ID is the first name David and 10 other users have previously input the name David, then the parameter N=10 is returned. The parameter N and ID info are then input to the main address allocation algorithm 113. This maps the user ID info transparently to a Vbank address. By a "transparent" mapping is meant a mapping such that the relationship between the user ID info and the Vbank address is apparent to the end user. This property of transparency means that the Vbank address has generally the same memorability as the user ID info itself, since the user ID info functions as mnemonic for the Vbank address. An example of a mapping algorithm may be as follows:

IF input is in closed word set then set Vbank element=input
ELSE take initial of input and set Vbank element=NATO
   phonetic alphabet (input initial)
AND append N to Vbank element.

This is the type of algorithm used in the examples above. . The closed word sets associated with the main algorithm 113 include details of associated pronunciations to allow mapping of different phoneme sequences, e.g. for alternative pronunciations of "smyth", as further described below.

The output of the algorithm is a unique text sequence. Several equivalent phoneme sequences may map to the unique text sequence, allowing for different pronunciations of the Vbank address by the user. The speech recognition grammar may then comprise a representation of the closed sets of all possible phoneme sequences that may be generated by the algorithm along with their associated textual equivalents.

Figure 6:
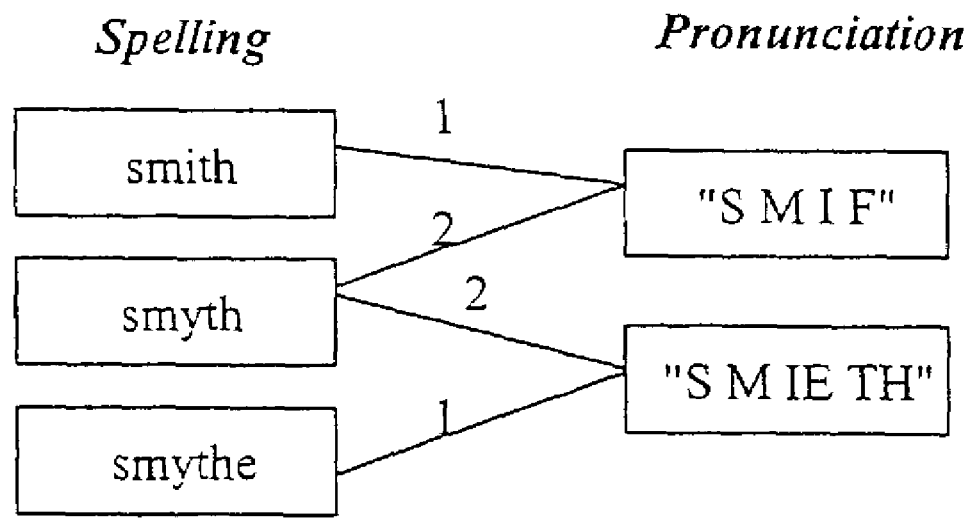
FIG. 6 shows mappings between spoken and textual forms of homophones and homographs.

The two digit number associated with one of the names is used to resolve ambiguity in the relationship between spoken and textual forms of the user names in the case homophones (shared pronunciation, different spelling) and homographs (common spelling, plural valid pronunciations) The term homonym is used in this description to refer to homophones or homographs. This allows the Vbank address to include the correct spelling of the user's name. An example is illustrated in FIG. 6.

In the figure three surnames are shown which share the pronunciations S M I F and S M IE TH in a way which may be described by a many-to-many mapping. For example, a user named Smithe may enrol on the text based web interface and be given the username smithe1@ipswich using the VBank format. It is assumed that this user will wish to retain the correct spelling of their surname and would therefore not be content with the label smith1@bank. This would be the case particularly if the user always uses the pronunciation S M IE TH for their name which is never used for the surname Smith. A potential difficulty now occurs when the user uses the IVR interface to access their account. Let us assume that the user always speaks their surname as 'S M I F'. The user may then phone the IVR and speak their username as "SM I F-W O N-AA T-I P S W I CH". Using the mapping shown in FIG. 6, this could be one of the following usernames:

smith1@ipswich smyth1@ipswich

How is the machine to know which username to use in the enrolment? There are three options:

1. Do not allow any surnames which have homophonic or homographic forms into the scheme. These could all be dealt with alternative formats such as the NATO phonetic alphabet. The problem with this approach is that 30% of written surnames share a pronunciation with another spelt surname. This would create a large number of exclusions.

2. Send both as alternatives and let the banking engine decide which one is valid. This would increase the complexity of the enrolment process and would require changes to the interface with the banking engine.

3. A third and preferred option is to embed information into the numeric part of the username to maintain specific spelling alternatives.

Option 3 is described further below. Consider the following portion of a speech recognition grammar.

| | |
|---|---|
| "S M I F-W O N" = | smith1 |
| "S M I F-T OO" = | smyth2 |
| "S M IE T H-T OO" = | smyth2 |
| "S M IE TH-W O N" = | smythe1 |

It has listed valid combinations of pronunciations and numbers and assigned textual labels to these combinations. The numbers correspond to the numbers shown on the arcs shown in the Figure above.

Now the pronounced forms of the combined name and number exactly identify a single written form, and if the text is assigned according to carefully derived rules users will never get the wrong spelling for their surname. By assigning all arcs from a given text form to the same number then the user may even vary the pronunciation of their name within all valid pronunciations and get the correct single text form.

In the examples so far described, a disambiguating number is used for one only of the address elements, and is placed following the element in question. This is the preferred format, but other arrangements are possible in which the number is at another position in the speech recognition grammar. Most current speech recognisers use finite state grammars with semantic tags attached to certain points in the grammar to enable a meaning to be attached to a lexical token or group of tokens. This approach was assumed by the above example which allowed the tag 'smith1' for example to be attached to the sequence "S M I F-W O N". If it is necessary to link the occurrence of a certain tuple of non-adjacent lexical tokens (e.g. S M I F and W O N) to a single meaning then it becomes more difficult. For example, consider a Vbank address of the format Firstname.surname 2-or-3-digit-number@ location.

In this example, the firstname, surname and town may all have homographs and homophones. If we were to adopt the number based approach described above for the firstname and surname, for example, then the number will have to be shared for three functions:

Coding correct text for surname
Coding correct text for firstname
Allowing disambiguation for multiple people with same name.

Figure 7:
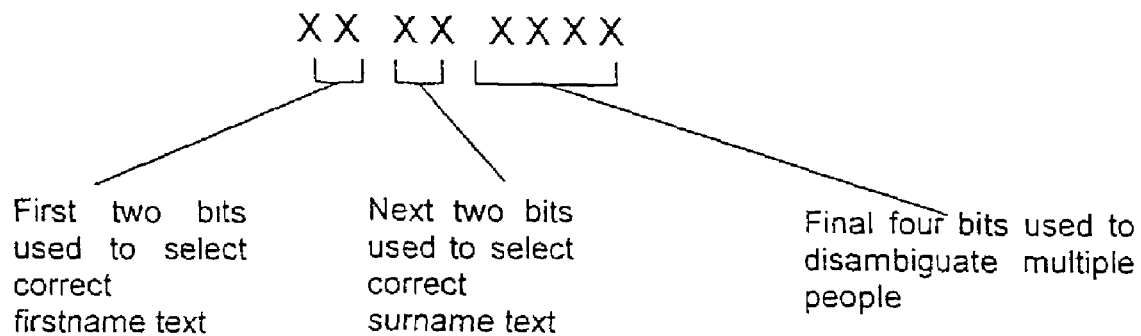
FIG. 7 shows the format of a multi-bit disambiguation number.

We could consider representing the number as decimal but taking a binary bit based approach to using this number space. For example the first two bits could select the correct firstname text, the second two could be for the surname and the final 4 could be used for disambiguation of multiple entries. This is illustrated in FIG. 7.

If we now code the actual surname and firstname text options into the grammar as tags on the pronunciations then the actual text can be selected by simple processing outside of the speech recogniser. For example, consider the following semantic labels for surnames and firstnames:

| "S M I F" = | "smith,smyth" |
| "S M IE TH" = | "-,smyth,smythe" |
| "C L EI R" = | "clare,clair,claire" |

Let us consider allocating a username to the first "claire smyth" from ipswich in the system. Assume that the options are labelled from the left starting with index 0. The firstname is the third text option for the only pronunciation for the clair group—"C L EI R", this it has index 2. The surname is the second option of BOTH pronunciations of the smith group of names, thus it has index 1. If we assume that the disambiguation part of the number range will be set to zero on this occasion, then the number should be 2+1*4=6. Hence:

"claire smyth"=>claire.smyth6@ipswich

The examples so far described do not provide for disambiguation of homograph and homophone confusions in the town name. This could potentially be allocated another bit in the disambiguation field. Where this is not done, then acoustically confusable towns are not included in the set of possible towns. Towns with exactly the same name may be treated as the same town for username purposes—homophones however need to be treated more carefully. A possible strategy in this instance if two common town names are homophones is to use an alternative location name, e.g. the county name, for the smaller of the two towns. Alternatively, the phonetic alphabet may be used to substitute for the "disallowed" name, as in the case of names falling outside the predefined set.

Figure 8:
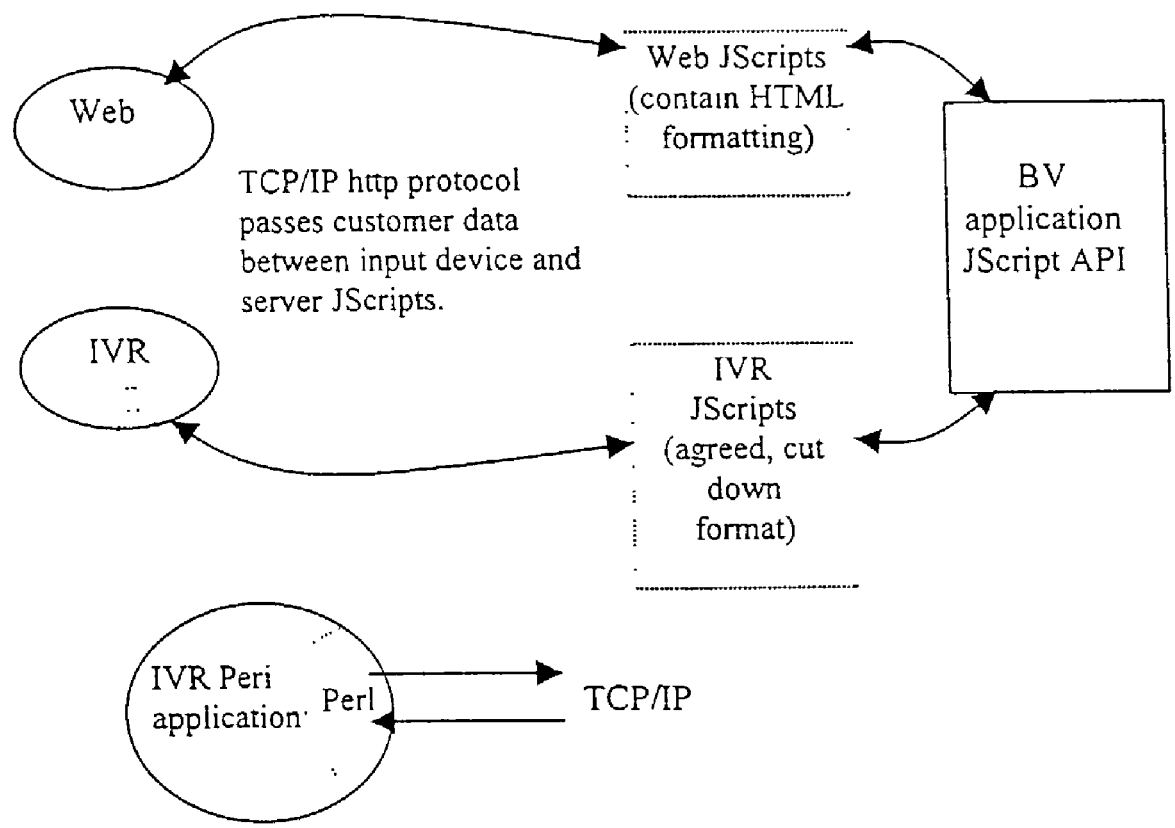
FIG. 8 shows a first implementation of interfaces between different channels and an application.

As described in outline above, the BroadVision application in this example uses a number of access channels, including both web and IVR channels, via a common API (application programming interface). The implementation of the interfaces is shown in further detail in FIG. 8. The BroadVision API is implemented using Perl scripts and an HTTP interface for both IVR and web channels. Server CGI scripts return HTML text and are replaced, in the case of the IVR interface, by custom scripts that return only the data required for the IVR interface, without the HTML wrapper text. Most of the functionality implemented in the Java scripts for the web channel is necessary for the IVR channel except the HTML formatting which is passed to the web browser. Hence the IVR channel uses derived scripts but the messages that it passes back to the IVR contain the minimum information necessary. The messages each channel passes to the Java scripts are the same and are of standard URL query variable type.

| Channel | Messages to BV application JScripts | Messages from BV application Jscripts |
|---|---|---|
| Web client | URL queries formulated by client side HTML. Each query asks for a banking function and passes the appropriate arguments. | A new HTML page containing results of previous query and facility for new queries. HTML is generated by a Java script which can also handle the new queries. |
| IVR client | URL queries formulated by client side Perl scripts. | Java script sends query result information only. The Perl scripts know the query formats and URLs of other Java scripts if they require more functions. |

Figure 9:
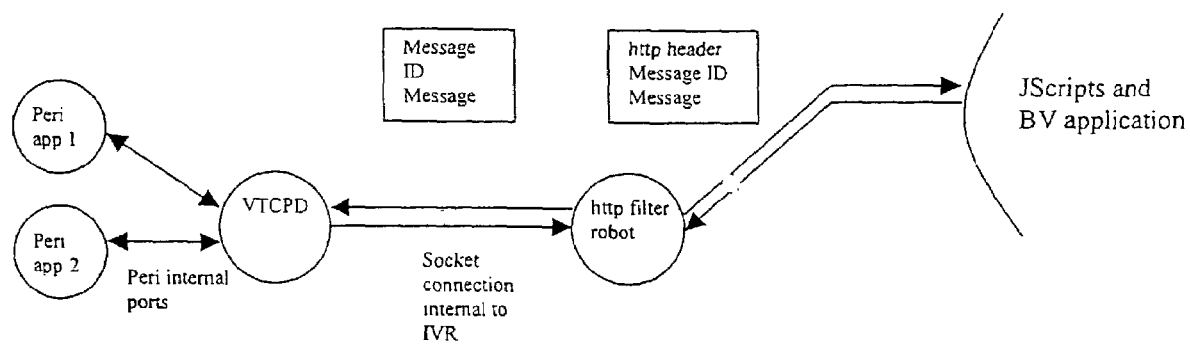
FIG. 9 shows an alternative implementation of interfaces between different channels and the application.

Input parameters are passed from the Perl code to the Perl scripts via a Perl system block. However there is no direct mechanism for the Perl script to pass return values back so they are stored in a file which the Perl code parses. FIG. 9 shows an alternative to the user of parameter passing between Perl code (that is the native applications running on the IVR platform) and Perl scripts on the server. The Perl code uses the VTCPD process to communicate with the external host. VTCPD is a Periphonics process that integrates with the rest of its environment and allows TCP/IP socket communication. However it does not directly support http protocols and requires extra header information to direct messages to the different applications running on the IVR.

As a further security measure, the speech recognition system may store a voiceprint of the user and compare that with the speech data. This voiceprint may be trained by the initial inputs of the user on the first few occasions that the user accesses the service. If subsequently the received speech data diverges significantly from the expected voiceprint, then the may request additional verification from the user, or may refuse access to the service.

The invention is by no means limited to implementations in which speech input is received via a conventional telephony network. For example, in an alternative implementation a customer uses a common terminal 3 for both text and speech input. The speech is transmitted in VoIP (voice over Internet Protocol) format.

For applications requiring the highest levels of security it is desirable to address the risk of the security code being intercepted in transmission from the user to the application that verifies the security code. In this case, the verification application may be run, locally at the customer terminal. The application in this case may be implemented using VXML (Voice eXtended Mark-up Language).

The invention claimed is:

1. A method of generating a user identification code for a speech recognition system, said user identification code being selected from a finite grammar defining all possible user identification codes, said grammar comprising a first and a second predetermined set of code words, wherein each set comprises a plurality of predefined and limited number of code words, and said sets being in a predetermined order, the method comprising the steps of:

a) receiving identification data corresponding to a user, said identification data comprising input words;
b) selecting a code word for each input word from the predetermined sets of code words, wherein the step of selecting comprises:
  for an input word that is equal to one of the plurality of code words in the first set, selecting said code word from the first set, and
  for an input word that is not equal to one of the plurality of code words in the first set, selecting from the second set a code word corresponding to the first character of the input word;
c) concatenating said selected code words in the predetermined order of the grammar to form a sequence for use as the user identification code, and if the formed sequence is equal to a previously formed sequence, then further concatenating a sequence number to the formed sequence to form a unique sequence for use as the user identification code; and
d) storing a record of the user identification code and of the identity of the associated user.

2. A method according to claim 1, wherein the first predetermined set of code words comprises personal names, and the identification data comprises the user's name.

3. A method according to claim 1, wherein the finite grammar includes a separator word between a first selected code word and a second selected code word.

4. A method according to claim 3, wherein the separator word has a single character only.

5. A method according to claim 1, wherein the finite grammar includes a phrase associated with one of said predetermined sets of code words and in which the phrase distinguishes between homonyms in said one set of predetermined words.

6. A method according to claim 5, in which the phrase is a number.

7. A method according to claim 1, further comprising:
  receiving from the user the user identification code;
  verifying the user identification code;
  determining the user associated with the verified identification code; and
  executing a transaction with the user.

8. A method according to claim 7, wherein receiving from the user the user identification code includes receiving a spoken identification code at a speech recognition device pre-programmed with a recognition grammar comprising the sets of code words.

9. A method according to claim 7, wherein the user identification code is received and the transaction executed via a text interface, and the method further comprises receiving another identification code and executing another transaction via a speech interface.

* * * * *